(12) United States Patent
Takori et al.

(10) Patent No.: US 12,496,962 B2
(45) Date of Patent: Dec. 16, 2025

(54) VEHICLE LIGHTING DEVICE

(71) Applicant: HONDA MOTOR CO., LTD., Tokyo (JP)

(72) Inventors: Masayoshi Takori, Saitama (JP); Yuji Tsuchiya, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 149 days.

(21) Appl. No.: 18/465,167

(22) Filed: Sep. 12, 2023

(65) Prior Publication Data
US 2024/0083348 A1 Mar. 14, 2024

(30) Foreign Application Priority Data

Sep. 14, 2022 (JP) .................. 2022-146605

(51) Int. Cl.
*B60Q 1/02* (2006.01)
*B60Q 1/24* (2006.01)
*H05B 47/11* (2020.01)

(52) U.S. Cl.
CPC .............. *B60Q 1/24* (2013.01); *H05B 47/11* (2020.01)

(58) Field of Classification Search
CPC ...... H05B 47/10; H05B 47/11; H05B 47/125; B60Q 1/02; B60Q 1/24
See application file for complete search history.

(56) References Cited

U.S. PATENT DOCUMENTS

2020/0114812 A1* 4/2020 Imaishi .................. B60Q 1/346
2022/0299181 A1* 9/2022 Takori ..................... F21S 41/155

FOREIGN PATENT DOCUMENTS

| EP | 2269869 A1 | 1/2011 |
| JP | 2009220631 A | 10/2009 |
| JP | 2011011593 A | 1/2011 |
| JP | 2013184614 A | 9/2013 |

OTHER PUBLICATIONS

Notification of Reasons for Refusal issued Jul. 9, 2024 in the JP Patent Application No. 2022-146605.
Notification of Reasons for Refusal issued Dec. 10, 2024 in the JP Patent Application No. 2022-146605.

* cited by examiner

*Primary Examiner* — Jimmy T Vu
(74) *Attorney, Agent, or Firm* — CKC & Partners Co., LLC

(57) ABSTRACT

A vehicle lighting device is provided which evokes caution of the approach of a vehicle at an early stage on the side of pedestrians irrespective of being day or night. A vehicle lighting device includes: a pattern irradiation part which irradiates irradiation light on a lateral irradiation region on a side of a travel path of one's own vehicle in a bright/dark mixed irradiation pattern in which bright regions and dark regions are alternately repeated; a situation recognition device which obtains an output corresponding to a situation of brightness outside of one's own vehicle; and a controller which, when the output of the situation recognition device corresponds to a first situation which is at least a predetermined specific brightness, controls the pattern irradiation part so as to be a first lighting mode which is not turned off.

2 Claims, 7 Drawing Sheets

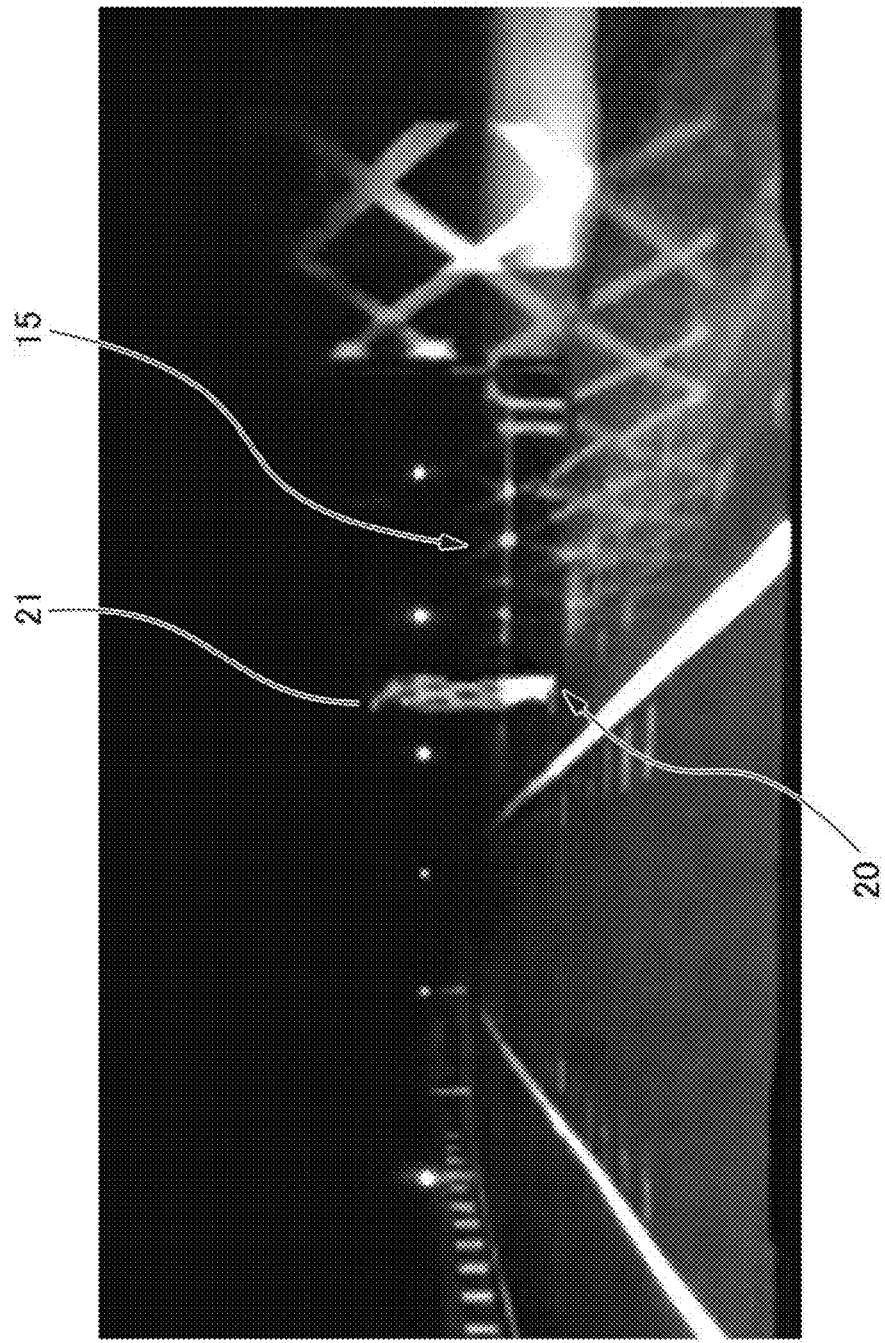

VEHICLE LIGHTING DEVICE

This application is based on and claims the benefit of priority from Japanese Patent Application No. 2022-146605, filed on 14 Sep. 2022, the content of which is incorporated herein by reference.

BACKGROUND OF THE INVENTION

Field of the Invention

The present invention relates to a vehicle lighting device.

Related Art

As a vehicle lighting device, a device has been proposed which suppresses dazzling of pedestrians, while enabling the driver to favorably visually recognize pedestrians (for example, refer to Patent Document 1). With the vehicle lighting device of Patent Document 1, the illumination amount to the upper body of the pedestrian is reduced according to the distance to the pedestrian acquired by a pedestrian detection sensor.

Patent Document 1: Japanese Unexamined Patent Application, Publication No. 2013-184614

SUMMARY OF THE INVENTION

However, it has been demanded to configure so that overlooking of pedestrians does not occur on the side of the driver, and configure so as to detect early the approach of a vehicle irrespective of being day or night, on the side of the pedestrian. Patent Document 1 gives no other viewpoint regarding this.

The present invention has been made taking account of the aforementioned such situation, and has an object of providing a vehicle lighting device which evokes caution of the approach of a vehicle at an early stage on the side of pedestrians irrespective of being day or night. In addition, it consequently has an object of contributing to the development of sustainable transportation systems which further improve traffic safety.

A vehicle lighting device according to a first aspect of the present invention (for example, the vehicle lighting device 1 described later) includes: a pattern irradiation part (for example, the projector unit 8 described later) which irradiates irradiation light on a lateral irradiation region on a side of a travel path of one's own vehicle in a bright/dark mixed irradiation pattern (for example, the bright/dark mixed irradiation pattern 15 described later) in which bright regions (for example, the bright region 13 described later) and dark regions (for example, the dark region 14 described later) are alternately repeated; a situation recognition device (for example, the situation recognition device 50 described later) which obtains an output corresponding to a situation of brightness outside of one's own vehicle; and a controller (for example, the lamp control ECU 9 described later) which, when the output of the situation recognition device corresponds to a first situation which is at least a predetermined specific brightness, controls the pattern irradiation part so as to be a first lighting mode which is not turned off.

According to a second aspect of the present invention, in the vehicle lighting device as described in the first aspect, when the output of the situation recognition device corresponds to a second situation which is less than the specific brightness, the controller controls the pattern irradiation part so as to be a second lighting mode having brighter irradiation light than the first lighting mode in response to the output of the second situation.

With the vehicle lighting device of the first aspect, when the output of the situation recognition device according to the situation of brightness outside of one's own vehicle corresponds to a first situation which is at least a predetermined specific brightness, and is typically daytime, the controller controls the pattern irradiation part so as to be the first lighting mode which is not turned off. For this reason, the pedestrian perceives the irradiation of the irradiation pattern from the pattern irradiation part even at daytime, and is prompted to direct attention to the approach of the vehicle. In addition, it consequently leads to further improvement in traffic safety and contribute to development of a sustainable transportation system.

With the vehicle lighting device of the second aspect, when the output of the situation recognition device according to the brightness situation outside of one's own vehicle corresponds to the second situation which is less than the predetermined specific brightness and typically nighttime, the controller controls the pattern irradiation part in response to the output of this second situation so as to enter the second lighting mode which has brighter irradiation light than the first lighting mode. For this reason, the pedestrian perceives the irradiation of the irradiation pattern from the pattern irradiation part, and is prompted to direct attention to the approach of the vehicle. Simultaneously, on the side of the driver of the vehicle, since the pedestrian is irradiated by the rhombus lattice pattern from the pattern irradiation part, the presence of the pedestrian is easily recognized by the visual characteristic of humans. Even under adverse conditions such as nighttime and rainy weather, it is possible to improve overlooking of pedestrians by drivers.

BRIEF DESCRIPTION OF THE DRAWINGS

FIG. 8 is a schematic diagram showing an aspect of the driving field of view at nighttime irradiated by the vehicle light device in FIG. 2.

DETAILED DESCRIPTION OF THE INVENTION

Hereinafter, an embodiment of the present invention will be explained while referencing the drawings. It should be noted that, in the following explanation, irradiation region is the irradiation area of light by the lamp, and irradiation pattern is a design by a bright region and dark region of the irradiation region, contour shape of the irradiation region, and other irradiation forms.

Figure 1:
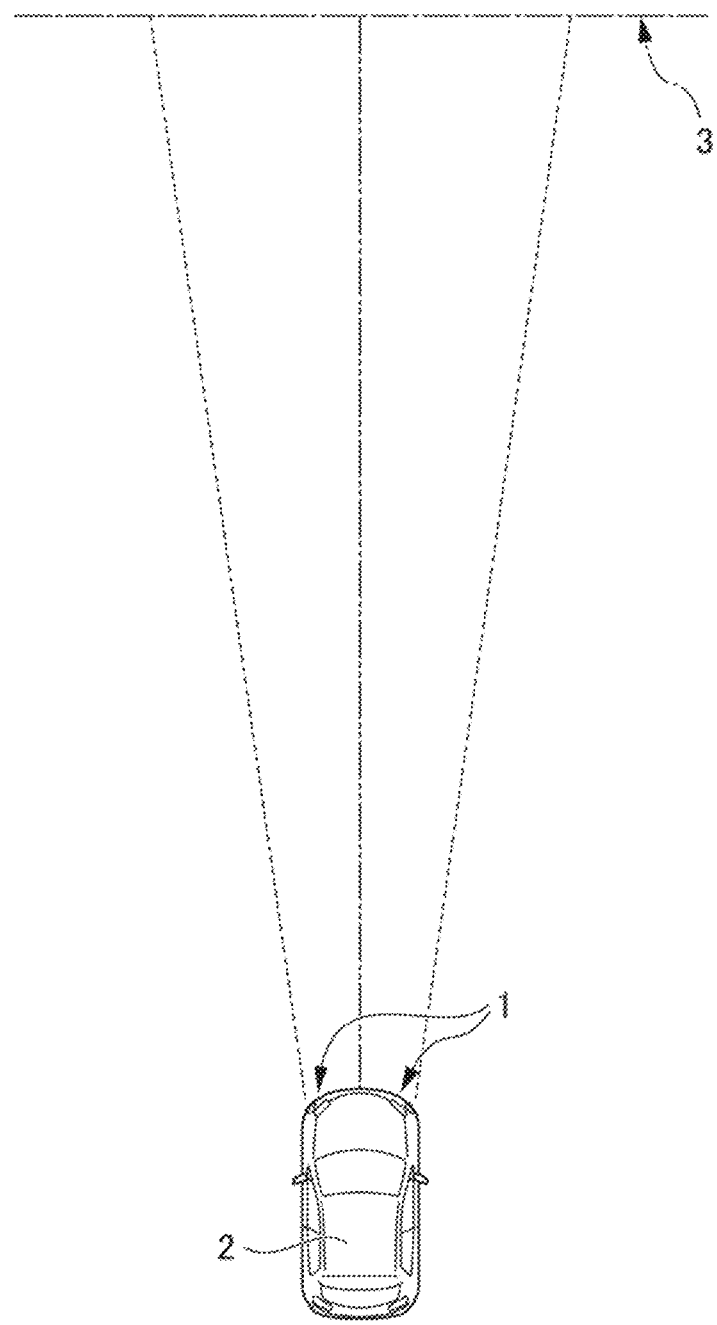
FIG. 1 is a schematic view showing an aspect of irradiation of illumination light by a vehicle lighting device according to an embodiment of the present invention.

FIG. 1 is a schematic view showing an aspect of irradiation of illumination light by a vehicle lighting device 1 according to an embodiment of the present invention. Ahead of the front of the vehicle lighting device 1 provided to a vehicle 2, for example, the distribution of irradiation light from the vehicle lighting device 1 is evaluated by an irradiation pattern formed on a test screen 3, which is a predetermined virtual vertical plane established 25 m ahead.

Figure 2:
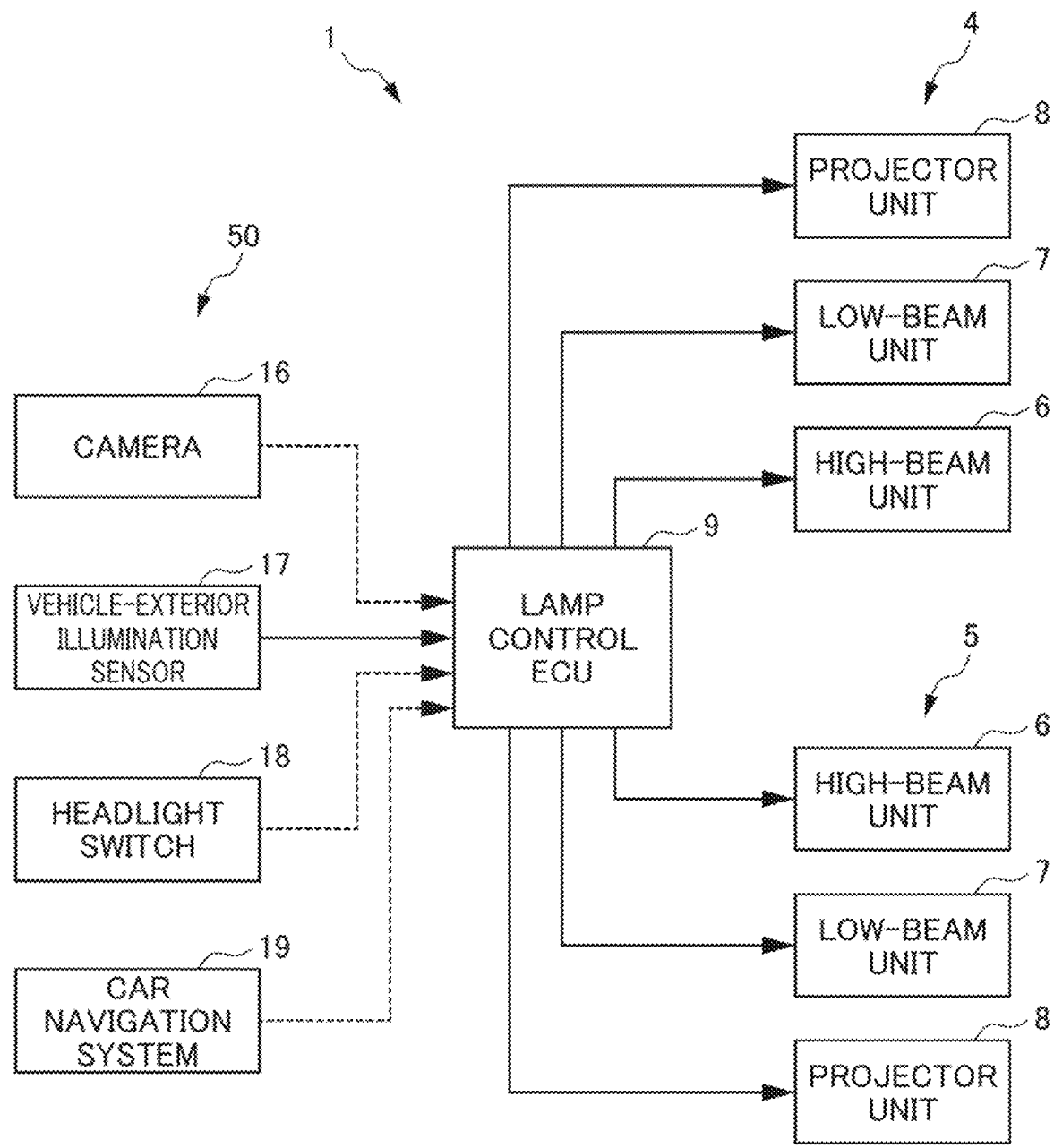
FIG. 2 is a block diagram of the vehicle lighting device according to an embodiment of the present invention.
Figure 3:
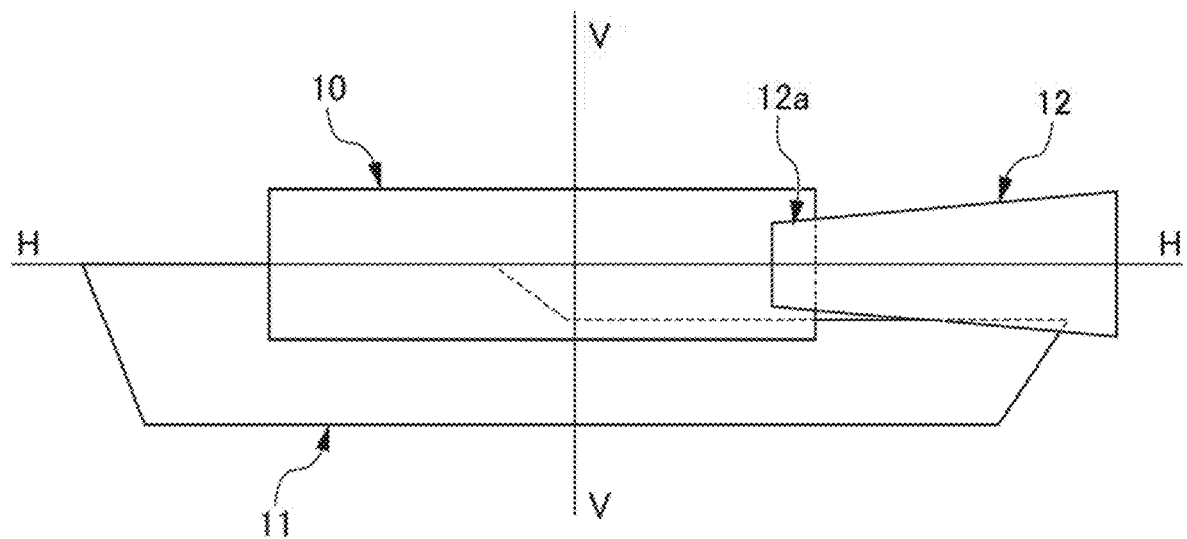
FIG. 3 is a view showing an irradiation region of each lamp in the vehicle lighting device in FIG. 2.

FIG. 2 is a block diagram of the vehicle lighting device 1, and FIG. 3 is a view showing the irradiation region of each lamp of the vehicle lighting device 1. At each of a left-side headlight unit 4 and right-side headlight unit 5 which are lamps, a high-beam unit 6, low-beam unit 7 and projector unit 8 are arranged in order from the inner side to the outer side in the vehicle-width direction of the vehicle 2. In each of the left-side headlight unit 4 and right-side headlight unit 5, the high-beam unit 6, low-beam unit 7 and projector unit 8 operate under the control of a lamp control ECU 9.

The high-beam unit 6 includes a light emitting element which is the light source, a light shield which defines the irradiation region and a lens. The light emitting element generates light by electric power being supplied from a power source (not shown), in response to a control signal from the lamp control ECU 9. The light from the light emitting element is reflected by the reflector. The reflected light from the reflector is irradiated from the lens toward a high-beam irradiation region 10 defined by the light shield.

The low-beam unit 7 includes a light emitting element which is a light source, a reflector, a light shield which defines the irradiation region, and a lens. The light emitting element generates light by electric power being supplied from a power source (not shown), in response to a control signal from the lamp control ECU 9. The light from the light emitting element is reflected by the reflector. The reflected light from the reflector is irradiated from the lens towards the low-beam irradiation region 11 defined by the light shield.

The projector unit 8 includes a light emitting element which is a light source, a spatial light modulator and a lens. As the spatial light modulator, for example, it is possible to utilize one of a form which reflects light, while independently modulating the several reflecting elements as in a DMD (Digital Micromirror Device). In this case, the projector unit 8 assumes a configuration of a DLP (Digital Light Processing: registered trademark) system using DMD, and can irradiate light in various predetermined irradiation patterns from the lens to the front of the vehicle 2 and its surroundings.

The irradiation pattern can also assume not only still image patterns of various shapes, but also the form of a video pattern. The light emitting element generates light by driving electric power being supplied from a power source (not shown) in response to a control signal from the lamp control ECU 9. The light from this light emitting element is spatially modulated by the spatial light modulator driven according to the control signal from the lamp control ECU 9, and light is irradiated from the lens of the projector unit 8 in various predetermined irradiation patterns in front of the vehicle 2 and the surroundings thereof. In other words, the projector unit 8 configures a pattern irradiation part which irradiates the irradiation light in a lateral irradiation region on a side of the travel path of the vehicle 2 in the irradiation pattern in which a bright region and dark region are alternately repeated.

By referencing FIG. 3, the irradiation region by the high-beam unit 6, low-beam unit 7 and projector unit 8 will be explained in the case of irradiating light on the test screen 3 from the vehicle lighting device 1 of FIG. 1. Herein, regarding the irradiation region by the projector unit 8, the irradiation region by the projector unit 8 of the right-side headlight unit 5 is shown.

The irradiation region by the projector unit 8 of the left-side headlight unit 4 is symmetrical with the irradiation region by the projector unit 8 of the right-side headlight unit 5 with the line V-V as the axis of symmetry.

The configuration and operation of the projector unit 8 of the left-side headlight unit 4 are similar to the projector unit 8 of the right-side headlight unit 5. For this reason, the configuration and operation of the projector unit 8 of the left-side headlight unit 4 invoke the explanations for the projector unit 8 of the right-side headlight unit 5.

The low-beam irradiation region 11 by the low-beam unit 7 has an oncoming-lane side cutoff line extending in parallel to a line H-H (horizontal line) more to the right side than the line V-V (vertical line) at the center in the left/right direction on the test screen 3. In addition, it has an own-lane side cutoff line extending along the line H-H at a higher position than the oncoming-lane side cutoff line. Both the oncoming-lane side cutoff line and own-lane side cutoff line are linked by an oblique cutoff line which slopes relative to the line H-H. The low-beam irradiation region 11 is a lower irradiation region on the front lower side of the vehicle 2.

The high-beam irradiation region 10 by the high-beam unit 6 forms a rectangle having a long side parallel to the line H-H and a short side parallel to the line V-V, and an intersection of their diagonals occupy a position substantially matching the intersection of the line H-H and line V-V. The high-beam irradiation region 10 overlaps the low-beam irradiation region 11 in a lower partial region including a portion more to the line V-V of each of the oncoming lane side cutoff line and the own-lane side cutoff line. The high-beam irradiation region 10 is an upper irradiation region more upwards than the low-beam irradiation region 11, which is the lower irradiation region, and more to the central side in the vehicle-width direction of the vehicle 2.

In the right-side pattern irradiation region 12, which is the irradiation region by the projector unit 8 of the right-side headlight unit 5, the irradiation pattern variously changes not by only switching of blinking, but also such as the contour shape of the region and the form of the irradiation pattern within this region, according to the mode switching signal from the lamp control ECU 9. However, the right-side pattern irradiation region 12 is a lateral irradiation region on the travel path side of the vehicle 2, even in the case of assuming the any form of irradiation pattern.

Concerning the ability of the projector unit 8, the right-side pattern irradiation region 12 can assume a wide form including an overlap region 12a which overlaps with the high-beam irradiation region 10. In the case of assuming this form, the right-side pattern irradiation region 12 makes a trapezoidal shape in a landscape orientation in which the height direction is parallel to the line H-H, and the upper base and lower base are parallel to the line V-V. This trapezoid is longer at the lower base which is relatively far from the line V-V than the upper base which is relatively close to the line V-V. In other words, the right-side pattern irradiation region 12 makes a shape in which the dimension along the line V-V towards the outer side in the vehicle width direction of the vehicle 2 widens.

The lamp control ECU 9 switches the operation mode of the vehicle lighting device 1, based on the output from a higher-order ECU and light switch lever which are not shown, and the camera 16, headlight switch 18, etc. equipped to the vehicle 2. In other words, the lamp control ECU 9 supplies a control signal to the high-beam unit 6, low-beam unit 7 and projector unit 8, and switches the operation mode of each of these units.

Figure 4:
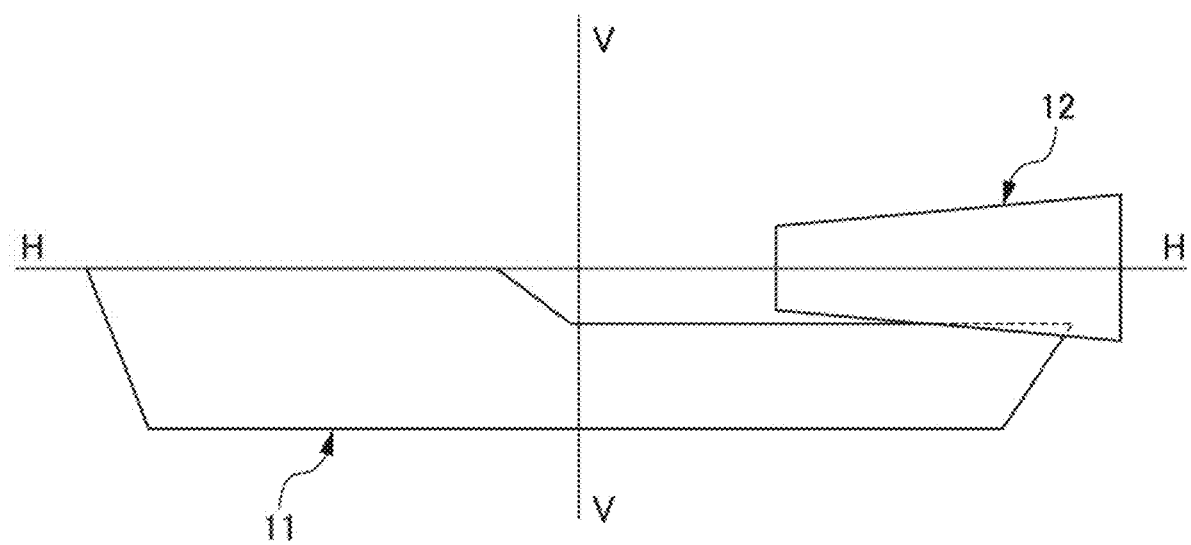
FIG. 4 is a view showing an irradiation region of a lamp corresponding to a case of the operation mode of the vehicle lighting device in FIG. 2 being a low-beam mode.

FIG. 4 is a view showing the irradiation region of irradiation light by the vehicle lighting device 1, in the case of the operation mode according to the lamp control ECU 9 being set to the low-beam mode. At night, when the light switch is in the position of "auto", and the light switch lever is at a position other than low beam, the vehicle lighting device 1 is often in the state of high-beam mode. In this state, when the camera 16 detects oncoming vehicles, ahead vehicles or a certain number of street lights, the operation mode of the vehicle lighting device 1 switches to the low-beam mode by the lamp control ECU 9. During low-beam mode, the high-beam unit 6 is turned off under the control of the lamp control ECU 9, the low-beam unit 7 irradiates the low-beam irradiation region 11, and the projector unit 8 irradiates the right-side pattern irradiation region 12.

Figure 5:
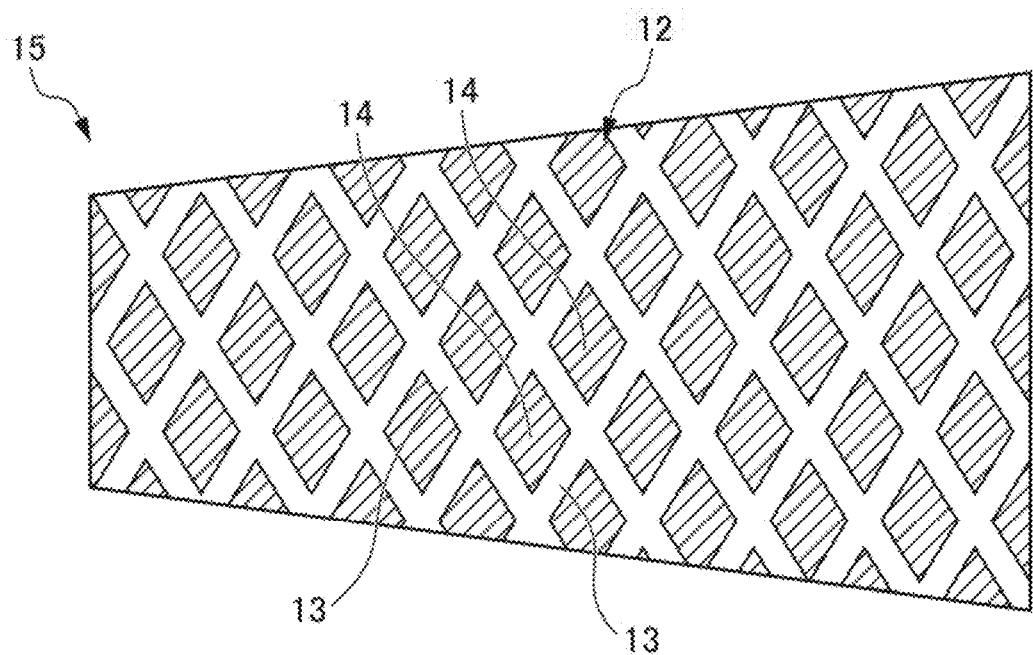
FIG. 5 is a view showing an example of an irradiation pattern by a pattern irradiation part of the vehicle lighting device in FIG. 2.

During low-beam mode in FIG. 4, the right-side pattern irradiation region 12 occupies a wide region of the trapezoidal shape in landscape orientation including the aforementioned overlap region 12a. In this wide region, the pattern irradiation light is irradiated in the bright/dark mixed irradiation pattern 15 in which the bright regions 13 and dark regions 14 are alternately repeated as shown in FIG. 5 from the projector unit 8. The bright/dark mixed irradiation pattern 15 in FIG. 5 is particularly a rhombus lattice pattern by the bright regions 13 of mesh pattern of rhombus lattice and the dark regions 14 surrounded by these bright regions 13. It should be noted that, during the high-beam mode which is not illustrated, the right-side pattern irradiation region 12 assumes a reduced shape without the portion of the overlap region 12a under the control of the lamp control ECU 9. Partial light emitting elements that irradiate the overlap region 12a are thereby turned off, and wasteful power consumption of the projector unit 8 is suppressed.

By the irradiated light of the bright/dark mixed irradiation pattern 15 from the projector unit 8 of the right-side headlight unit 5, the presence of a pedestrian on the roadside is easily recognized to the driver by the visual characteristic of humans on the driver side. Even under adverse conditions such as night and rainy weather, it is possible to improve the overlooking of pedestrians by the driver.

The projector unit 8 turns on independently from the turning on/off of the high-beam unit 6 and low-beam unit 7, under the control of the lamp control ECU 9 in a certain condition. In other words, irrespective of the brightness outside the vehicle, the projector unit 8 irradiates irradiation light by the bright/dark mixed irradiation pattern 15.

Figure 6:
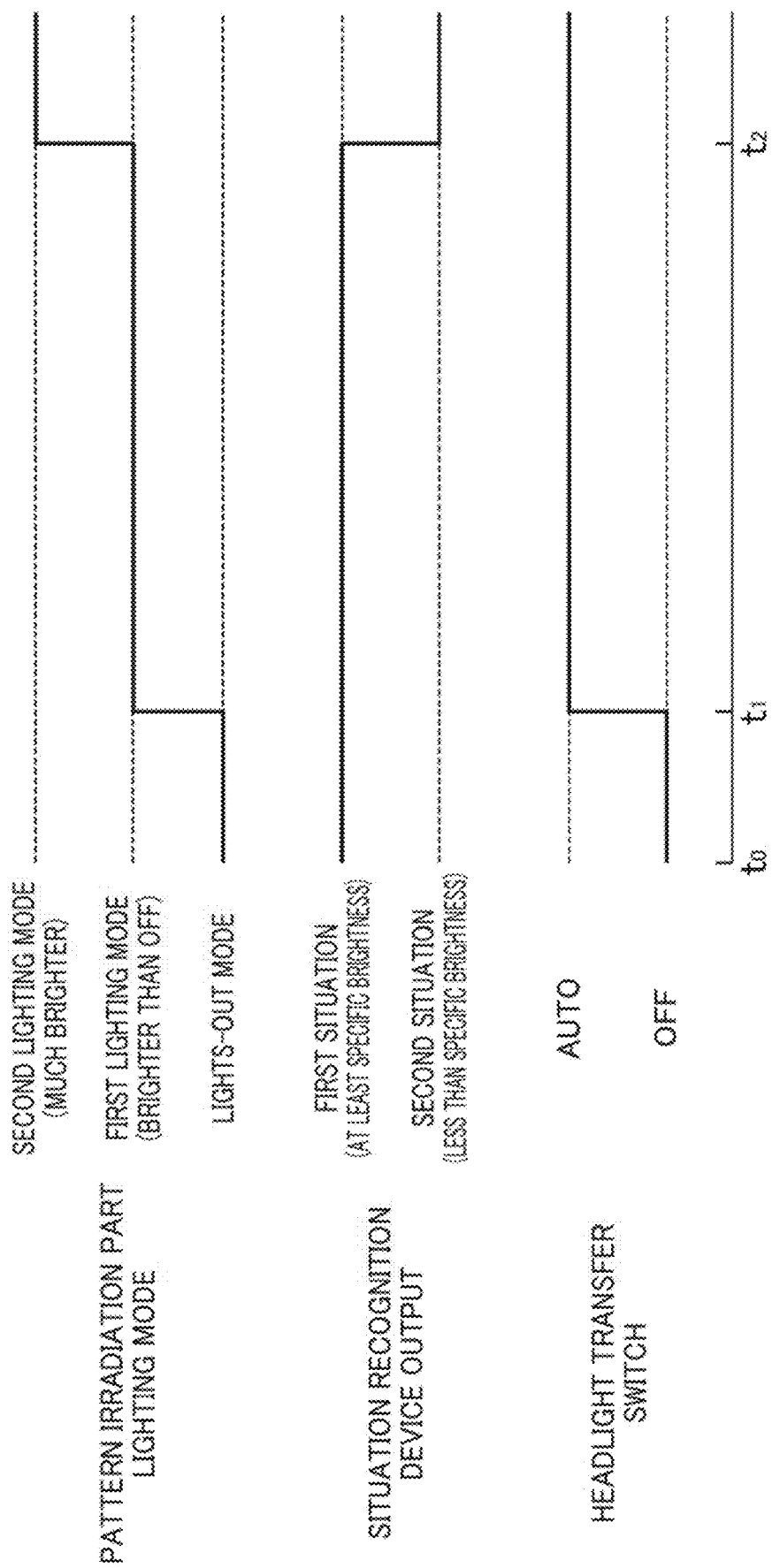
FIG. 6 is a timing chart showing operation of the vehicle lighting device in FIG. 2.

Next, the operation of the projector unit 8 under the control of the lamp control ECU 9 will be explained by referencing FIG. 2 and FIG. 6. FIG. 6 is a timing chart showing the operation of the vehicle lighting device 1. The respective outputs of the camera 16, vehicle-exterior illumination sensor 17, headlight switch 18 and car navigation system 19 are supplied to the lamp control ECU 9. The camera 16, vehicle-exterior illumination sensor 17, headlight switch 18 and car navigation system 19 configure a situation recognition device 50 which obtains an output corresponding to the situation of the brightness outside one's own vehicle, in addition to illumination and time.

The camera 16 is provided so as to make the driving field of view of the driver as an imaging field of view at a position looking out the top of the front windshield of the vehicle 2. The imaging data including information corresponding to the brightness of the imaging field of view acquired by the camera 16 is supplied to the lamp control ECU 9. The vehicle-exterior illumination sensor 17 is provided to the vehicle 2 so as to detect the illumination outside of the vehicle, and the detection output is supplied to the lamp control ECU 9. The headlight switch 18, for example, is integrally provided with the turn-signal lever also serving as a light switch lever. In response to an operation by the operator, an operation command signal of selecting the operation mode of the left-side headlight unit 4 and right-side headlight unit 5 is created. The operation command signal formed by the headlight switch 18 is supplied to the lamp control ECU 9.

The car navigation system 19 supplies the current position related to the vehicle 2, current time, calendar information, and information related to the illumination of the surroundings of the vehicle 2 such as weather information to the lamp control ECU 9. The lamp control ECU 9 calculates the illumination in the periphery of the vehicle 2, depending on the output of any of the camera 16, vehicle-exterior illumination sensor 17, headlight switch 18 and car navigation system 19, or a plurality thereof. It should be noted that, in the case of configuring the situation recognition device 50 with solely the vehicle-exterior illumination sensor 17, the configuration and processing of the lamp control ECU 9 become relatively simple.

In FIG. 6, the driver of the vehicle 2 turns the headlight switch 18 to the OFF position in the time interval from time t0 to t1. The time interval from time t0 to time t1, for example, is a period from when a main switch (not shown) of the vehicle 2 is turned ON until immediately before an operation on the headlight switch 18 is performed. On the other hand, in the time interval from time t0 until time t2 which is a later time than time t1, the situation recognition device 50 supplies an output corresponding to a first situation in which the brightness in the surroundings of the vehicle 2 is at least a specific brightness to the lamp control ECU 9. First situation is a situation which is a brightness at which the vehicle 2 can be safely driven while the low-beam unit 7 and high-beam unit 6 are turned OFF. In this state, the lamp control ECU 9 sets the projector unit 8, which is the pattern irradiation part, to a lights-out mode. Therefore, in the time interval from time t0 to time t1, the projector unit 8 maintains the lights-out state.

When the driver of the vehicle 2 turns the headlight switch 18 from OFF to AUTO at time t1, the projector unit 8 turns to a first lighting mode under the control of the lamp control ECU 9. At this time, a situation continues in which the situation recognition device 50 supplies an output corresponding to the aforementioned first situation to the lamp control ECU 9. The first lighting mode is a lighting mode in which the brightness of the irradiation light brighter than lights-out, and less than the second lighting mode which is much brighter.

Figure 7:
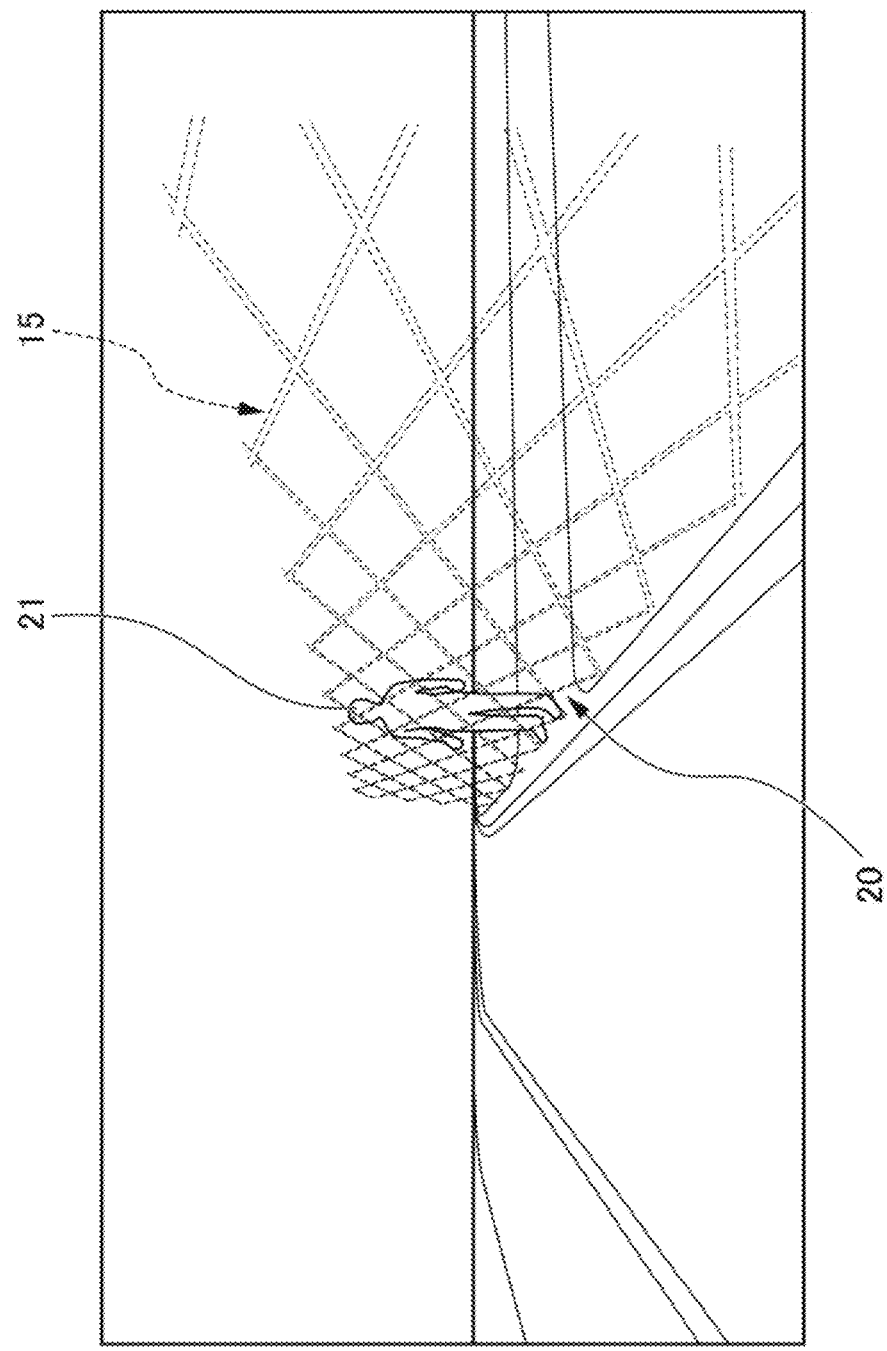
FIG. 7 is a schematic diagram showing an aspect of the driving field of view at daytime irradiated by the vehicle light device in FIG. 2.

An aspect of the driving field of view at daytime in which the projector unit 8 irradiates the pattern irradiation light in the first lighting mode is schematically shown in FIG. 7. The irradiation light of the bright/dark mixed irradiation pattern 15, which is the rhombus lattice pattern of FIG. 5, is irradiated on the pedestrian 21 on the roadside 20 from the projector unit 8. At daytime, this irradiation light is barely visible from the side of the driver of the vehicle 2; however, from the side of the pedestrian 21, since the contrast of the bright/dark mixed irradiation pattern 15 alternately enters the eyes, it is perceived as a relatively obvious stimulus. For this reason, the pedestrian 21 notices the approach of the vehicle 2 at an early stage, and safety consideration is evoked.

In FIG. 6, during the elapse of time from time t1 to time t2, the position of the headlight switch 18 is maintained at AUTO. On the other hand, the surroundings of the vehicle 2 gradually darken, and before long, when reaching the second situation where the brightness around the vehicle 2 is less than the specific brightness at time t2, the situation recognition device 50 supplies output corresponding to the second situation to the lamp control ECU 9. Second situation is a brightness of a degree at which the low-beam unit 7 is turned on in the form explained by referencing FIG. 4, for example. At time t2, the projector unit 8 turns to the second lighting mode under the control of the lamp control ECU 9. The second lighting mode is a lighting mode in which the brightness of the irradiation light of the projector unit 8 is maintained in a state much brighter than in the first lighting mode.

The aspect of the driving field of view at nighttime in which the projector unit 8 irradiates the pattern irradiation light in the second lighting mode is schematically shown in FIG. 8. Irradiation light of the bright/dark mixed irradiation pattern 15, which is the rhombus lattice pattern of FIG. 5, is irradiated from the projector unit 8. By the pedestrian 21 on the roadside 20 being irradiated by the rhombus lattice pattern, the presence of the pedestrian 21 on the roadside 20 is easily recognized by the visual characteristic of humans by the driver. Even under adverse conditions such as nighttime and rainy weather, it is possible to improve overlooking of the pedestrian 21 by a driver.

According to the vehicle lighting device 1 of the present embodiment, the following effects are exerted.

(1) The vehicle lighting device 1 includes the projector unit 8 which irradiates irradiation light on a lateral irradiation region on the side of the travel path of one's own vehicle in a bright/dark mixed irradiation pattern 15 in which the bright regions 13 and dark regions 14 are alternately repeated; the situation recognition device 50 which obtains an output corresponding to the brightness situation outside of one's own vehicle; and the lamp control ECU 9 which controls the projector unit 8 so as to be the first lighting mode which is not turned OFF, when the output of the situation recognition device 50 corresponds to the first situation which is at least a predetermined specific brightness. When the output of the situation recognition device 50 according to the situation of brightness outside of one's own vehicle corresponds to the first situation, which is at least the predetermined specific brightness or higher, and typically daytime, the lamp control ECU 9 controls the projector unit 8 so as to be the first lighting mode which is not turned off. For this reason, the pedestrian perceives the irradiation of the bright/dark mixed irradiation pattern 15 from the projector unit 8 even at daytime, and is prompted to direct attention to the approach of the vehicle 2.

(2) The vehicle lighting device 1, when the output of the situation recognition device 50 according to the brightness situation outside of one's own vehicle corresponds to the second situation which is less than the predetermined specific brightness and typically nighttime, the lamp control ECU 9 controls the projector unit 8 in response to the output of this second situation so as to enter the second lighting mode which has brighter irradiation light than the first lighting mode. For this reason, the pedestrian 21 perceives the irradiation of the irradiation light of the bright/dark mixed irradiation pattern 15, which is a rhombus lattice pattern from the projector unit 8, and is prompted to direct attention to the approach of the vehicle. Simultaneously, on the side of the driver of the vehicle, since the pedestrian 21 is irradiated by the rhombus lattice pattern from the projector unit 8, the presence of the pedestrian is easily recognized by the visual characteristic of humans. Even under adverse conditions such as nighttime and rainy weather, it is possible to improve overlooking of pedestrians by drivers.

Although an embodiment of the present invention has been explained above, the present invention is not limited thereto. The configurations of detailed parts may be modified as appropriate within the scope of the gist of the present invention. In the aforementioned embodiment, a configuration is adopted in which the projector unit 8 which is the pattern irradiation part turns on in response to setting the headlight switch to the AUTO position. Instead of this, for example, it is also possible to adopt a configuration in which the operation mode of the headlight is set to the AUTO mode by default, and a headlight switch is not provided. In addition, lighting control may be performed so as to always being the first lighting mode as default irrespective of the brightness outside the vehicle, and further the first lighting mode and second lighting mode may be the same, and may be controlled so as to be the first lighting mode which has brighter irradiation light than the second lighting mode.

EXPLANATION OF REFERENCE NUMERALS 1 vehicle lighting device
2 vehicle
3 test screen
4 left-side headlight unit
5 right-side headlight unit
6 high-beam unit
7 low-beam unit
8 projector unit (pattern irradiation part)
9 lamp control ECU
10 high-beam irradiation region (upper irradiation region)
11 low-beam irradiation region (lower irradiation region)
12 right-side pattern irradiation region (side irradiation region)
12a overlap region
13 bright region
14 dark region
15 bright/dark mixed irradiation pattern
16 sensor
17 vehicle-external illumination sensor
18 headlight switch
19 car navigation system
20 roadside
21 pedestrian
50 situation recognition device

What is claimed is:
1. A vehicle lighting device comprising:
a pattern irradiation part which irradiates irradiation light on a lateral irradiation region on a side of a travel path of a vehicle in a bright and dark mixed irradiation pattern in which bright regions and dark regions are alternately repeated;
a situation recognition device which obtains an output corresponding to a situation of brightness outside of the vehicle; and
a controller which, when the output of the situation recognition device corresponds to a first situation which is at least a predetermined specific brightness, controls the pattern irradiation part so as to be a first lighting mode which is not turned off, wherein the controller changes the bright and dark mixed irradiation pattern to a shape that is more reduced when a headlight of the vehicle is a high beam than when the headlight of the vehicle is a low beam.

2. The vehicle lighting device according to claim 1, wherein, when the output of the situation recognition device corresponds to a second situation which is less than the specific brightness, the controller controls the pattern irradiation part so as to be a second lighting mode having brighter irradiation light than the first lighting mode in response to the output of the second situation.

* * * * *